(12) United States Patent
Otoshi (10) Patent No.: US 9,400,370 B2
(45) Date of Patent: Jul. 26, 2016

(54) OPTICAL APPARATUS

(71) Applicant: CANON KABUSHIKI KAISHA, Tokyo (JP)

(72) Inventor: Tatsuya Otoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/601,085

(22) Filed: Jan. 20, 2015

(65) Prior Publication Data

US 2015/0205067 A1 Jul. 23, 2015

(30) Foreign Application Priority Data

Jan. 23, 2014 (JP) .................. 2014-010188

(51) Int. Cl.
*G02B 7/02* (2006.01)
*G03B 17/00* (2006.01)
*G02B 7/10* (2006.01)
*G02B 7/04* (2006.01)

(52) U.S. Cl.
CPC .............. *G02B 7/102* (2013.01); *G02B 7/023* (2013.01); *G02B 7/04* (2013.01); *G02B 7/10* (2013.01)

(58) Field of Classification Search
CPC .......... G02B 7/02; G02B 7/021; G02B 7/022; G02B 7/023; G02B 7/04; G02B 7/10
USPC ............. 359/811, 819, 821–826, 830; 396/73
See application file for complete search history.

(56) References Cited

U.S. PATENT DOCUMENTS

2009/0232485 A1* 9/2009 Sasaki ................... G02B 7/102
396/73

FOREIGN PATENT DOCUMENTS

JP 2011-059331 A 3/2011

* cited by examiner

*Primary Examiner* — William Choi
(74) *Attorney, Agent, or Firm* — Cowan, Liebowitz & Latman, P.C.

(57) ABSTRACT

An optical apparatus includes an image pickup optical system, an evacuating optical system movable between a shooting state and an evacuating state, a first urging member, a first moving member, a second moving member including a sliding portion and a first, second, and third cam follower portions, and a first cam cylinder member including a plurality of first cam portions. The first, second, and third cam follower portions follows the plurality of first cam portions. A second urging member urging in a redial direction of the second moving member is attached to the first cam follower portion. In a case where the evacuating optical system is the evacuating state, a straight line extended in a direction, where the evacuating optical system works on the sliding portion by the first urging member, intersects with a line segment between the second and third cam follower portions.

3 Claims, 11 Drawing Sheets

OPTICAL APPARATUS

BACKGROUND OF THE INVENTION

1. Field of the Invention

The invention relates an optical apparatus including an evacuating lens mechanism.

2. Description of the Related Art

In conventional lens barrel, a slide lens which is a part of a lens unit evacuates from an optical axis when retracting so as to thin retracting thickness of the lens barrel for miniaturization of the lens barrel.

Japanese Patent Laid-Open No. 2011-59331 discloses a lens barrel including a first lens group, a second lens group, a third lens group, and a fourth lens group. The third lens group includes a base plate which is reciprocated along an optical axis by a cam follower mechanism, and a lens holder which holds a lens and is swingably supported relative to the base plate. The lens holder is rotatably urged to a center of the optical axis by a torsion spring when shooting, and abuts against an abutting portion provided on the base plate so as to maintain the lens on the optical axis. A cam surface formed on the lens holder abuts against protruding portion protruding from a sensor holder which holds an image pickup element in an optical axis direction, and as a result, the lens holder rotates in a direction of resisting an urging force of the torsion spring and evacuates from the optical axis when retracting. One cam follower pin of three cam follower pins formed on the fourth lens group which is moved by the cam is positioned at one side by the spring for stable optical performance.

However, in Japanese Patent Laid-Open No. 2011-59331, the fourth lens group between the sensor holder and the third lens group needs to avoid the protruding portion so that the protruding portion protruding from the sensor holder evacuates the third lens group. As a result, a light leakage may be generated from the part avoided the protruding portion. If the protruding portion is formed on the fourth lens group, the generation of the light leakage is prevented, but the urging force of the torsion spring applied to the protruding portion formed on the fourth lens group when evacuating the third lens group may be larger than spring force of the cam follower pin. As a result, since the lens group wobbles in the lens barrel and a position of the protruding portion is instability, precise evacuating lens mechanism may not be achieved.

SUMMARY OF THE INVENTION

In view of the foregoing, the invention provides an optical apparatus including high accurate evacuating lens mechanism.

An optical apparatus as one aspect of the invention includes an image pickup optical system, an evacuating optical system movable between a shooting state where an optical element is positioned on an optical axis of the image pickup optical system and an evacuating state where the optical element evacuates from the optical axis, a first urging member urging the evacuating optical system so that the evacuating optical system becomes the shooting state, a first moving member including the evacuating optical system and the first urging member, and configured to move in an optical axis direction, a second moving member including a sliding portion which the evacuating optical system slides on when moving, and configured to move in the optical axis direction, and a first cam cylinder member including a plurality of first cam portions. The second moving member includes a first cam follower portion, a second cam follower portion, and a third cam follower portion at positions approximately equally divided the second moving member into three in a circumference direction. The first, second, and third cam follower portions follows the plurality of first cam portions formed on the first cam cylinder member so that the second moving member moves in the optical axis direction. A second urging member urging in a redial direction of the second moving member as viewed from the optical axis direction is attached to the first cam follower portion. In a case where the evacuating optical system is the evacuating state, a straight line extended in a direction, where the evacuating optical system works on the sliding portion by the first urging member, intersects with a line segment between the second and third cam follower portions.

Further features of the invention will become apparent from the following description of exemplary embodiments (with reference to the attached drawings).

DESCRIPTION OF THE PREFERRED EMBODIMENTS

Exemplary embodiments of the invention will be described below with reference to the accompanied drawings. In each of the drawings, the same elements will be denoted by the same reference numerals and the duplicate descriptions thereof will be omitted.

A lens barrel as an example of an optical apparatus according to the invention is explained. When the lens barrel according to the embodiment is detachably attached to an image pickup apparatus body such as a digital camera, they work as a camera system. The camera system including the lens barrel according to the embodiment also corresponds to the optical apparatus of the invention.

Figure 1:
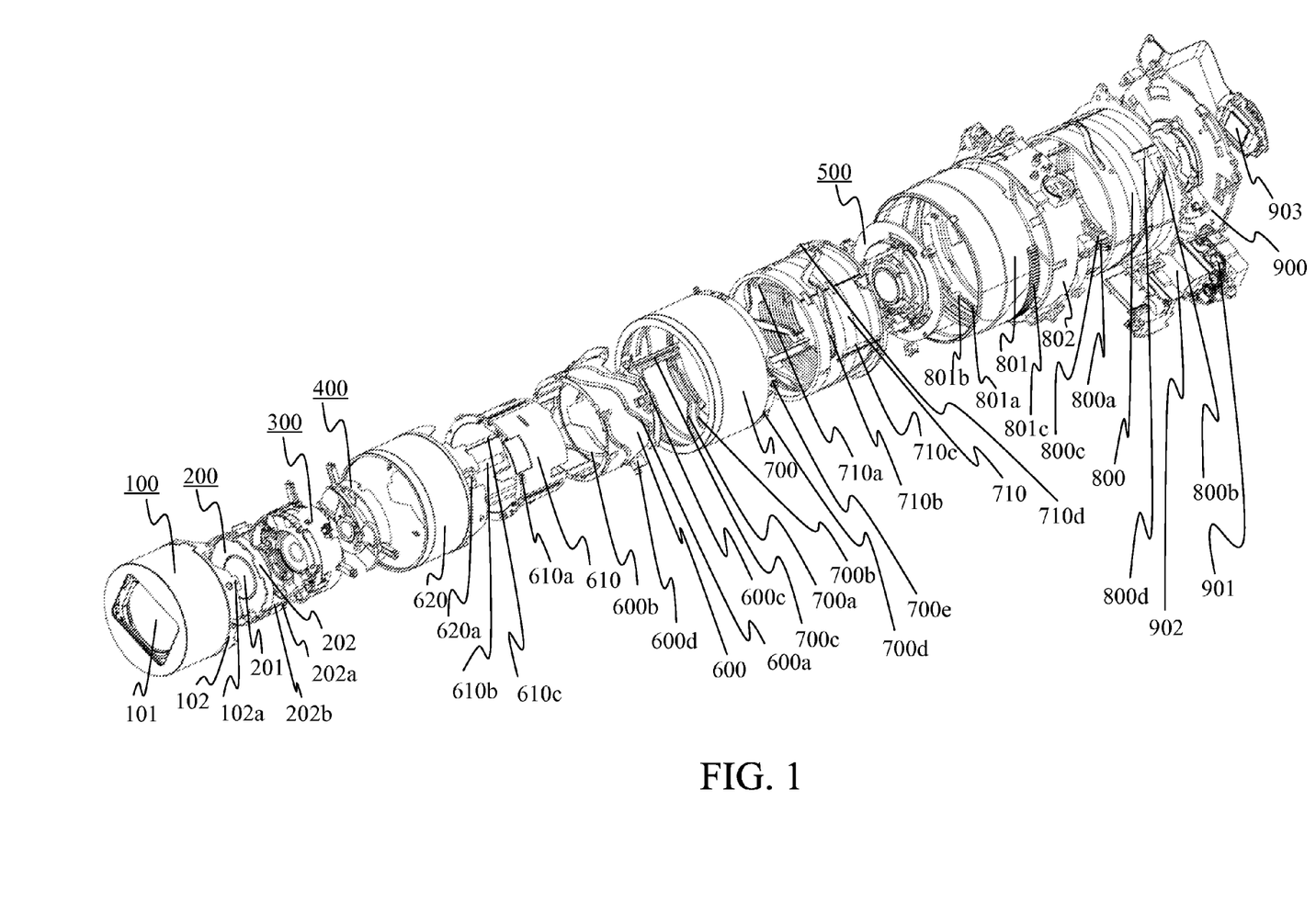
FIG. 1 is an exploded perspective view of a lens barrel according to an embodiment of the invention.

FIG. 1 is an exploded perspective view of the lens barrel according to an embodiment of the invention. The lens barrel according to the embodiment is a five group lenses optical system (image pickup optical system) including optical elements of first to fifth lenses.

A first lens group 100 includes a first lens 101, and a cylindrical first lens holder 102 holding the first lens 101. A cam pin 102a protruding to an inner side in a radial direction and a key groove (not illustrated) restricting rotation of the first lens group 100 are formed on an inner peripheral surface of the first lens holder 102.

A second lens group 200 includes a second lens 201, and a cylindrical second lens holder 202 holding the second lens 201. A cam pin 202a, which protrudes to an outer side in a radial direction and is formed at an equal angular interval in a circumference direction, and a straight key 202b restricting rotation of the second lens group 200 are formed on an outer peripheral surface of the second lens holder 202.

Figure 2:
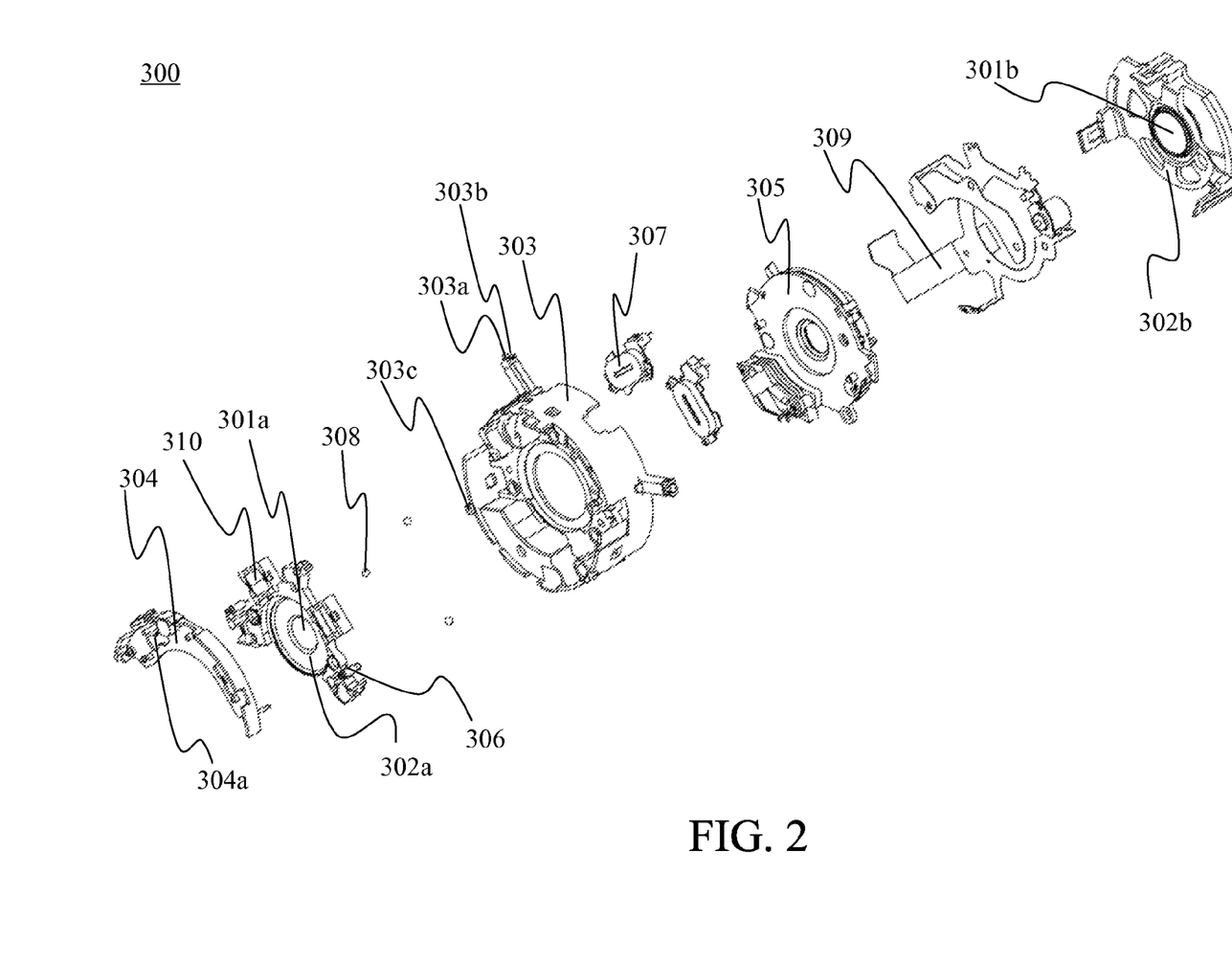
FIG. 2 is an exploded perspective view of a third lens group.

FIG. 2 is an exploded perspective view of a third lens group 300. The third lens group 300 includes a third lens a group 301a arranged on an object side, a third lens b group 301b arranged on an image surface side, a third lens holder 302, a third group base 303, a third group cover 304, and an aperture shutter apparatus 305.

The third lens holder 302 includes a third lens a group holder 302a holding the third lens a group 301a, and a third lens b group holder 302b holding the third lens b group 301b. The third lens a group holder 302a and the third lens b group holder 302b are adhesively fixed to each other on an outer side of the aperture shutter apparatus 305. The third lens a group holder 302a also holds an IS magnet 310. An IS spring 306 is hung between the third lens a group holder 302a and the third group base 303.

The third group base 303 includes an IS coil 307 and an IS ball 308, and is fastened to the third group cover 304 by snap-fit. A third lens FPC 309 is fixed to the third group cover 304. An IS sensor (not illustrated) is fixed to the third lens FPC 309 so as to face the IS magnet 310. The IS sensor is inserted into a cutout portion 304a of the third group cover 304.

The third lens a group holder 302a is held on the third group base 303 so as to be movable in a surface perpendicular to an optical axis by operation of the IS spring 306 and the IS ball 308. The third lens a group lens holder 302a also moves to an arbitrary position by a driving force generated by operation of the IS coil 307 and the IS magnet 310, and a position of the third lens a group lens holder 302a is controlled by the IS sensor.

The aperture shutter apparatus 305 between the third lens a group 301a and the third lens b group 301b adjusts a light amount using a shutter blade and an aperture blade.

Wiring patterns which are a signal line of the IS sensor, a power supply line to the IS coil 307, and a power supply line to the aperture shutter apparatus 305 are formed on the third lens FPC 309.

A cam pin 303a, which protrudes to an outer side in a radial direction and is formed at an equal angular interval in a circumference direction, and a straight key 303b restricting rotation of the third lens group 300 are formed on an outer peripheral surface of the third group base 303. Additionally, a straight key 303c restricting linear moving of an inner straight cylinder 610 described below is formed on the outer peripheral surface of the third group base 303.

Figure 3:
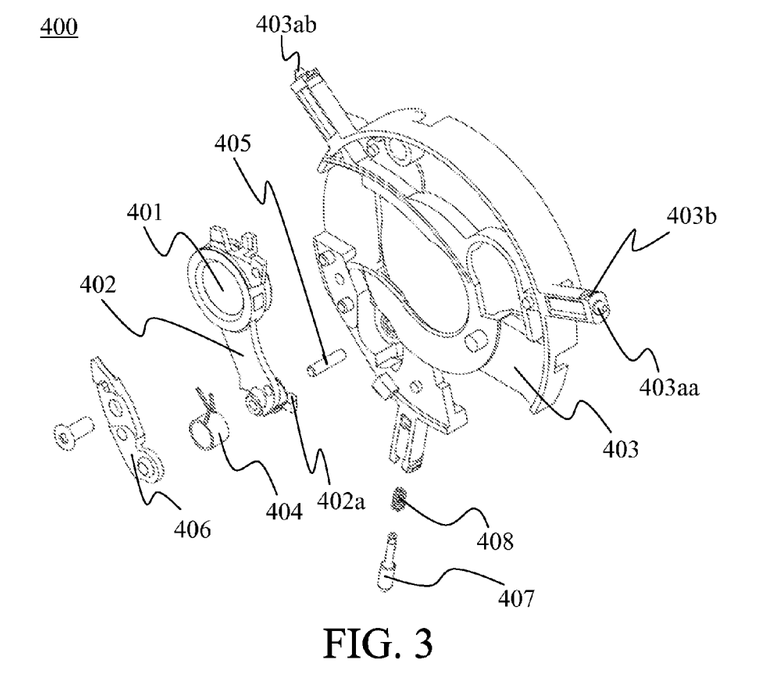
FIG. 3 is an exploded perspective view of a fourth lens group.
Figure 4:
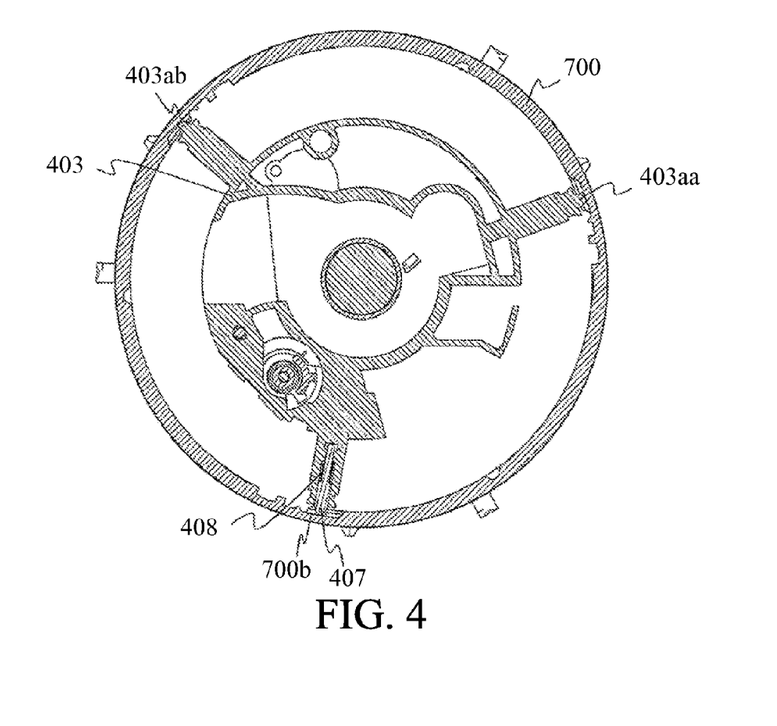
FIG. 4 is an arrangement plan of a fourth group base and an outer cam ring.

FIG. 3 is an exploded perspective view of a fourth lens group 400, and FIG. 4 is an arrangement plan of a fourth group base 403 and an outer cam ring (second cam cylinder member) 700. The fourth lens group (first moving member) 400 includes a fourth lens 401, a fourth lens holder 402 holding on the fourth lens 401, a fourth group base 403, a torsion spring 404, a swinging axis 405, a fourth group base cover 406, a movable pin 407, and a compression spring 408.

The swinging axis 405 is pushed in the fourth group base 403, and a fourth lens holder (evacuating optical system) 402 is swingably supported by the swinging axis 405. A torsion spring (first urging member) 404 urges the fourth lens holder 402 in a direction where the fourth lens 401 is arranged on an image pickup axis. The swinging axis 405 is pushed in the fourth group base cover 406, and the fourth group base cover 406 is fastened to the fourth group base 403.

The movable pin (fourth cam follower portion) 407 is movably held in a radial direction of the fourth group base 403 by snap-fit, and the compression (third urging member) 408 is held between the fourth group base 403 and the movable pin 407. The movable pin 407 is urged to the radial direction of the fourth group base 403 by the compression spring 408.

Fixing pins (fifth cam follower portion, sixth cam follower portion) 403aa, 403ab protruding to an outer side in the radial direction of the fourth group base 403, and a straight key 403b restricting rotation of the fourth lens group 400 are formed on an outer peripheral surface of the fourth group base 403.

As illustrated in FIG. 4, the fixing pins 403aa, 403ab, and the movable pin 407 are arranged at positions approximately equally divided in the radial direction of the fourth group base 403. The movable pin 407 abuts against a cam groove (second cam portion) 700b of an outer cam ring 700 by an urging force of the compression spring 408. The fixing pins 403aa, 403ab also abut against the cam groove (second cam portion) 700b by the urging force of the compression spring 408. The fourth group base 403 is held by the outer cam ring 700 without space between their contact spots. When the outer cam ring 700 rotates, the movable pin 407, and the fixing pins 403aa, 403ab follows the cam groove 700b so that the fourth group base 403 moves along the optical axis.

Figure 5A:
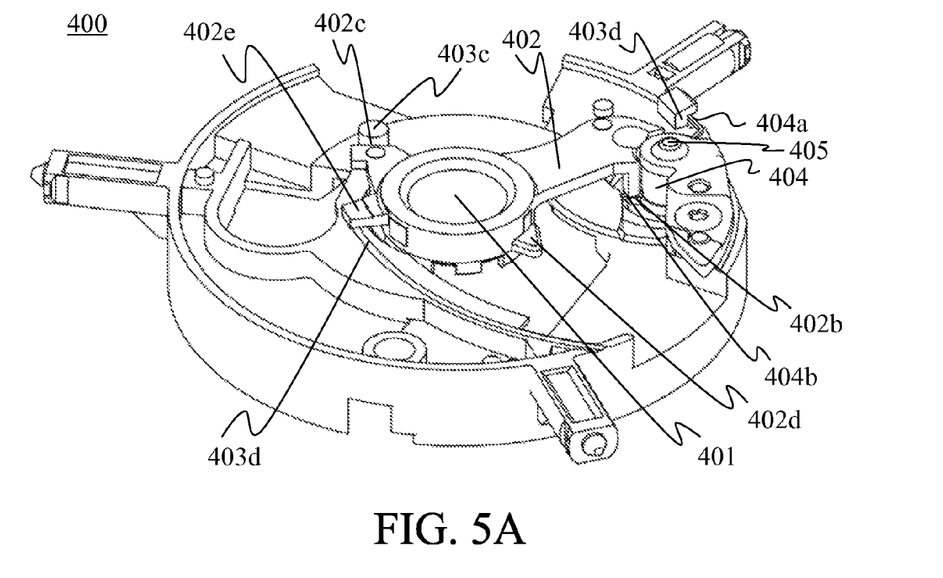
FIGS. 5A and 5B are a perspective view of the fourth lens group.
Figure 5B:
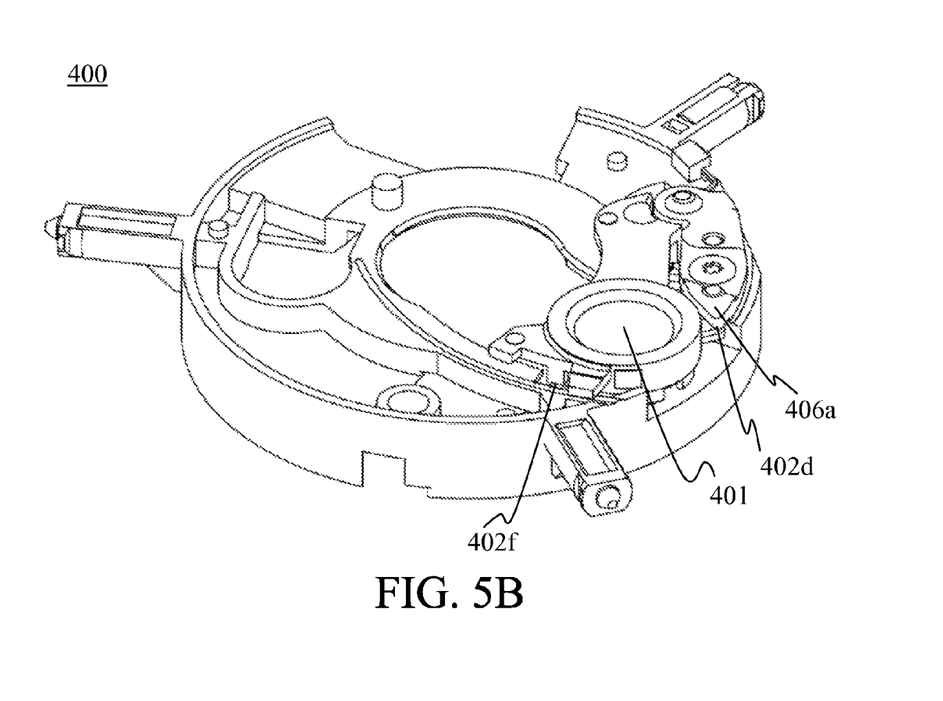

FIGS. 5A and 5B are a perspective view of the fourth lens group 400. FIG. 5A illustrates a shooting state where the fourth lens 401 is arranged on the image pickup optical axis, and FIG. 5B illustrates an evacuating state where the fourth lens 401 evacuates from the optical axis.

A protruding portion 403c protruding in an optical axis direction is formed on the fourth group base 403. A first end 404a of the torsion spring 404 engages with a sliding portion 403d formed on the fourth group base 403, and a second end 404b of the torsion spring 404 engages with an engaging portion 402b formed on the fourth lens holder 402.

When the fourth lens 401 is positioned on the optical axis, an abutting portion 402c formed on the fourth lens holder 402 abuts against the protruding portion 403c of the fourth group base 403 by urging force of the torsion spring 404.

When the fourth lens holder 402 moves between the shooting state and the evacuating state, a protruding portion 402e formed an outer periphery of the fourth lens holder 402 rotatably slides on the sliding portion 403d of the fourth group base 403 around the swinging axis 405.

The fourth lens holder 402 also includes a regulating portion 402f. When external force such as a dropping impact is applied to the lens barrel in the shooting state, wobbling of the fourth lens holder 402 is restricted by sandwiching the fourth group base 403 between the protruding portion 402e and the regulating portion 402f. In the evacuating state, a regulating portion 406a of the fourth group base cover 406 restricts operation of an extending portion 402d of the fourth group base 402 instead of the regulating portion 402f.

Figure 6:
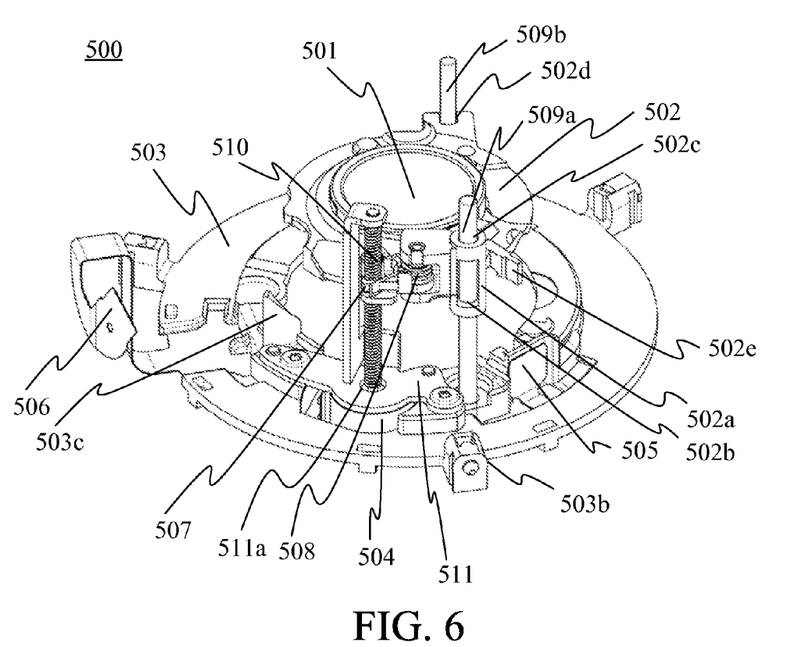
FIG. 6 is a perspective view of a fifth lens group.
Figure 7:
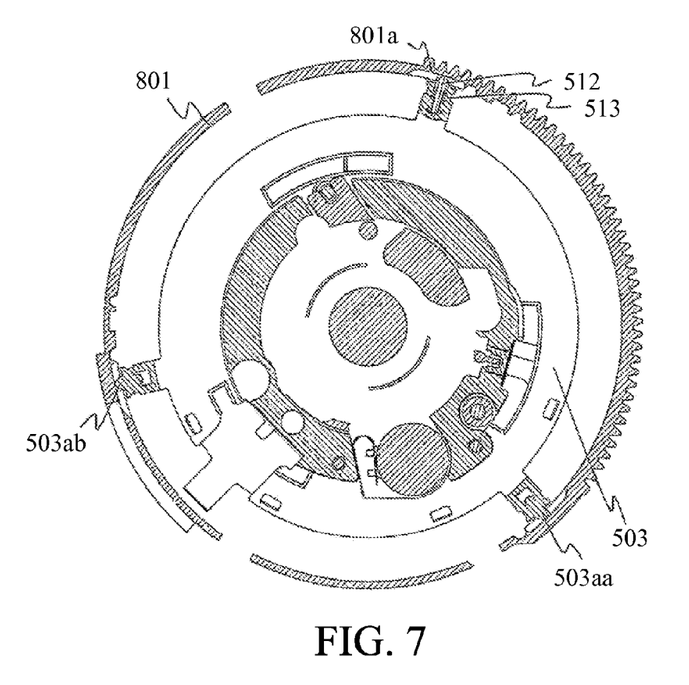
FIG. 7 is an arrangement plan of a fifth group base and a driving ring.

FIG. 6 is a perspective view of a fifth lens group 500, and FIG. 7 is an arrangement plan of a fifth group base 503 and a drive ring (first cam cylinder member) 801. The fifth lens group 500 includes a fifth lens 501, a fifth lens holder 502, the fifth group base 503, a motor 504, a photointerrupter 505, a fifth lens FPC 506, and a rack 507. The fifth lens group 500 also a rack spring 508 attached to the rack 507, guide bars 509a, 509b held by the fifth group base 503, a screw 510, a flange 511, a movable pin 512, and a compression spring 513.

The fifth lens holder 502 holds the fifth lens 501, and includes a sleeve 502a. Sleeve holes 502b, 502c engaging with the guide bar 509a are formed on both sides of the sleeve 502a. An U shape groove 502d engaging with the guide bar 509b is formed on the fifth lens holder 502. The fifth group base 503 slidably holds the fifth lens holder 502 through the guide bars 509a, 509b.

The movable pin (first cam follower portion) 512 is movably held in a radial direction of the fifth group base (second moving member) 503 by snap-fit, and the compression spring (second urging member) 513 is held between the fifth group base 503 and the movable pin 512. The movable pin 512 is urged to the radial direction of the fifth group base 503 by the compression spring 513.

Fixing pins (second cam follower portion, third cam follower portion) 503aa, 503ab protruding to an outer side in the radial direction of the fifth group base 503, and a straight key 503b restricting rotation of the fifth lens group 500 are formed on an outer peripheral surface of the fifth group base 503.

As illustrated in FIG. 7, the fixing pins 503aa, 503ab, and the movable pin 512 are arranged at positions approximately equally divided in the radial direction of the fifth group base 513. The movable pin 512 abuts against a cam groove (first cam portion) 801a of a drive ring 801 by an urging force of the compression spring 513. The fixing pins 503aa, 503ab also abut against the cam groove (first cam portion) 801a by the urging force of the compression spring 513. The fifth group base 503 is held by the drive ring 801 without space between their contact spots. When the drive ring 801 rotates, the movable pin 512, and the fixing pins 503aa, 503ab follows the cam groove 801a so that the fifth group base 503 moves along the optical axis.

Additionally, a protruding portion (sliding portion) 503c protruding on an object side in the optical axis direction is formed on the fifth group base 503. The protruding portion 503c abuts against the evacuating cam 402a of the fourth lens holder 402 in the evacuating state so as to evacuate the fourth lens holder 402 from the optical axis.

The screw 510 and the flange 511 are attached to the AF motor 504 moving the fifth lens holder 502 in the optical axis direction includes a screw 510 and a flange. The AF motor 504 is fixed to the fifth group base 503 through the flange 511. The screw 510 engages with the rack 507 urged by the rack spring 508, and a flange hole 511a for evacuating the screw 510 is formed on the flange 511. When the screw 510 rotates by the AF motor 504, the rack 507 held by the fifth lens holder 502 moves in the optical axis direction along with the fifth lens holder 502.

The photointerrupter 505 detects a position of the fifth lens holder 502 in the optical axis direction relative to the fifth group base 503 by determining whether or not a detected portion 502e shields the light. The fifth lens FPC 506 provides power to the AF motor 504 and the photointerrupter 505.

An inner cam ring 600 is arranged an inner side of the first lens holder 102, and the inner straight cylinder 610 is arranged on an inner side of the inner cam ring 600. The inner cam ring 600 and the inner straight cylinder 610 rotatable with each other integrally move in a straight direction.

A first group cam groove 600a is formed on an outer periphery of the inner cam ring 600. The cam pin 102a of the first lens holder 102 slides on the first group cam groove 600a so as to move the first lens group 100 in the optical axis direction. Additionally, a cam pin 600c, which protrudes to an inner side in a radial direction and is formed at an equal angular interval in a circumference direction, and a rotation transmission key 600d, which rotational force is transmitted from the outer cam ring 700, are formed on the outer periphery of the inner cam ring 600. A second group cam groove 600b is formed on an inner periphery of the inner cam ring 600. The cam pin 202a of the second lens holder 202 arranged on an inner side of the inner straight cylinder 610 slides on the second cam groove 600b so as to move the second lens group 200 in the optical axis direction.

A flange extending on an outer periphery side beyond the inner cam ring 600 are formed on an object side end of the inner straight cylinder 610. A straight key 610a, which slides on a straight guide groove formed on the first lens holder 102 so as to straightly guide the first lens group 100, is formed on the flange. A cutout groove 610b, which the straight key 202b of the second lens holder 202 slides on so as to straightly guide the second lens group 200, are formed on a cylinder portion of the inner straight cylinder 610. A straight groove 610c is formed on an inner peripheral surface of the inner straight cylinder 610. The straight key 303c of the third group base 303 fits with the straight groove 610c so as to restrict linear movement of the inner straight cylinder 610.

An inner cam ring cover 620, which is arranged on an outer side of the first lens holder 102, covers the first group cam groove 600a formed on the outer periphery of the inner cam ring 600 so as not to expose the first group cam groove 600a to appearance. The inner cam ring 600 and the inner cam ring cover 620, which are fastened with each other by three snap fits 620a, integrally move.

An outer straight cylinder 710 is arranged on an outer side of the inner cam ring cover 620, and the outer cam ring 700 is arranged on an outer side of the outer straight cylinder 710. The outer straight cylinder 710 and the outer cam ring 700 rotatable with each other integrally move in a straight direction.

A cam groove 710a is formed on an inner periphery of the outer straight cylinder 710. The cam pin 600c of the inner cam ring 600 slides on the cam groove 710a so as to move the inner cam ring 600 in the optical axis direction. The outer straight cylinder 710 includes a through groove 710b, which has the same locus as the cam groove 710a and is formed on a position different from the cam groove 710a, and the rotation transmission key 600d of the inner cam ring 600 is inserted into the through groove 710b. Additionally, a cutout groove 710c straightly guiding the third group lens 301 and the fourth group lens 401 is formed on the outer straight cylinder 710. The straight key 303c of the third group base 303 and the straight key 403b of the fourth group base 403 slide on the cutout groove 710c so as to straightly guide the third group lens 301 and the fourth group lens 401. A flange extending on an outer periphery side beyond the outer cam ring 700 are formed on an image side end of the outer straight cylinder 710, and a straight key 710d protruding in a circumference direction is formed on the flange.

A third group cam groove 700a and a fourth group cam groove 700b are formed on an inner peripheral surface of the outer cam ring 700. The cam pin 303a of the third group base 303 slides on the third group cam groove 700a so as to move the third group lens 301 in the optical axis direction, and the cam pin formed on the fourth group base 403 slides on the fourth group cam groove 700b so as to move the fourth group lens 401 in the optical axis direction. Additionally, a rotation transmission groove 700c transmitting rotation of the outer cam ring 700 to the inner cam ring 600 is formed on the inner peripheral surface of the outer cam ring 700. The rotation transmission key 600d of the inner cam ring 600 slides on the rotation transmission groove 700 so as to transmit rotation of the outer cam ring 700 to the inner cam ring 600.

A cam pin 700d, which protrudes to an outer side in a radial direction and is formed at an equal angular interval in a circumference direction, and a rotation transmission key 700e, which rotational force of the drive ring 801 is transmitted to, are formed on the outer peripheral surface of the outer cam ring 700.

A fixing cylinder 800 is arranged on the outer side of the outer cam ring 700, and the drive ring 801 is arranged on an outer side of the fixing cylinder 800. A cover cylinder 802 is arranged on an outer side of the drive ring 801. The fixing cylinder 800 and the cover cylinder 802 are fixed to a sensor holder 900 holding an image pickup element 904. The drive ring 801 restricted linear movement is rotatably held.

A cam groove 800a is formed on an inner peripheral surface of the fixing cylinder 800. The cam pin 700d of the outer cam ring 700 slides on the cam groove 800a so as to move the outer cam ring 700 in the optical axis direction. The fixing cylinder 800 includes a through groove 800b, which has the same locus as the cam groove 800a, and is formed on a position different from the cam groove 800a, and the rotation transmission key 700e of the outer cam ring 700 is inserted into the through groove 800b. Additionally, a straight groove 800c straightly guiding the outer straight cylinder 710 is formed on the fixing cylinder 800. The straight key 710d of the outer straight cylinder 710 fits with the straight groove 800c so as to straightly guide the fixing cylinder 800. The plurality of straight keys 710d of the outer straight cylinder 710 and the plurality of straight grooves 800c of the fixing cylinder 800 are formed. Since the cam groove 800a and the through groove 800b supply a region where the straight groove 800c is not formed, the fixing cylinder 800 is straightly guided from a retracted position to an extended end. Additionally, a cutout groove 800d straightly guiding the fifth lens 501 is formed on the fixing cylinder 800. A straight key 503b of the fifth group base 503 slides on the cutout groove 800d, the fifth lens 501 is straightly guided.

The fifth group cam groove 801a is formed on an inner peripheral surface of the drive ring 801. The cam pin 503a of the fifth group base 503 slides on the fifth group cam groove 801a so as to move the fifth lens 501. Additionally, a rotation transmission groove 801b, which transmits a rotation to the outer cam ring 700, is formed on the inner peripheral surface of the drive ring 801. The rotation transmission key 700e of the outer cam ring 700 slides on the rotation transmission groove 801b so as to transmit rotation of the drive ring 801 to the outer cam ring 700.

A gear 801c is formed on an outer peripheral surface of the drive ring 801. The gear 801c is coupled to a zoom motor 902 through a gear train 901. Energizing the zoom motor 902 rotates the drive ring 801, rotation of the drive ring 801 transmits to the outer cam ring 700 and the inner cam ring 600, and the first to fifth lens groups move in the optical axis direction according to a locus of each cam groove.

The sensor holder 900 includes an optical filter 903, an image pickup element 904, the gear train 901, and the zoom motor 902.

An extending and retracting mechanism between the retracted state and the shooting state, and a zoom drive mechanism are explained.

Figure 8A:
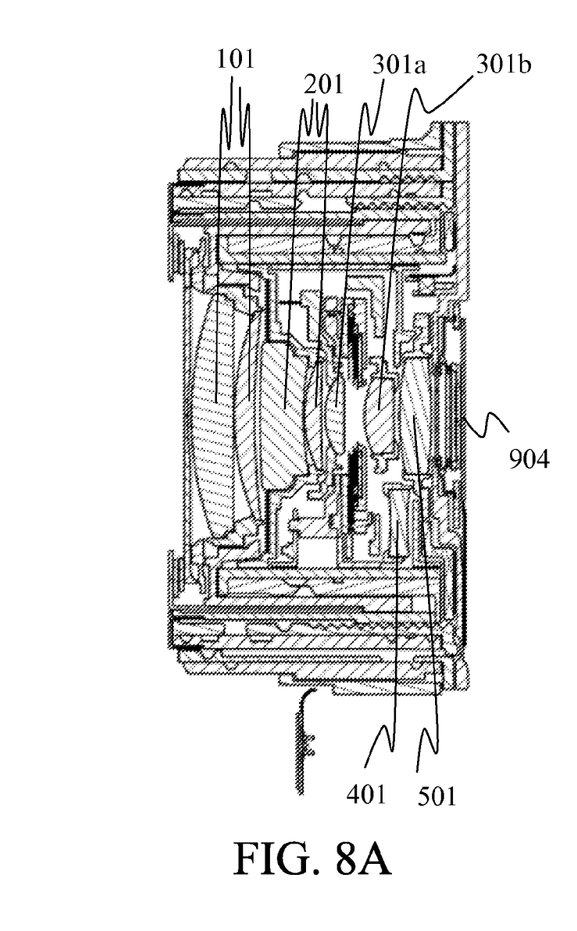
FIGS. 8A and 8B are sectional views of the lens barrel in a retracted state.
Figure 8B:
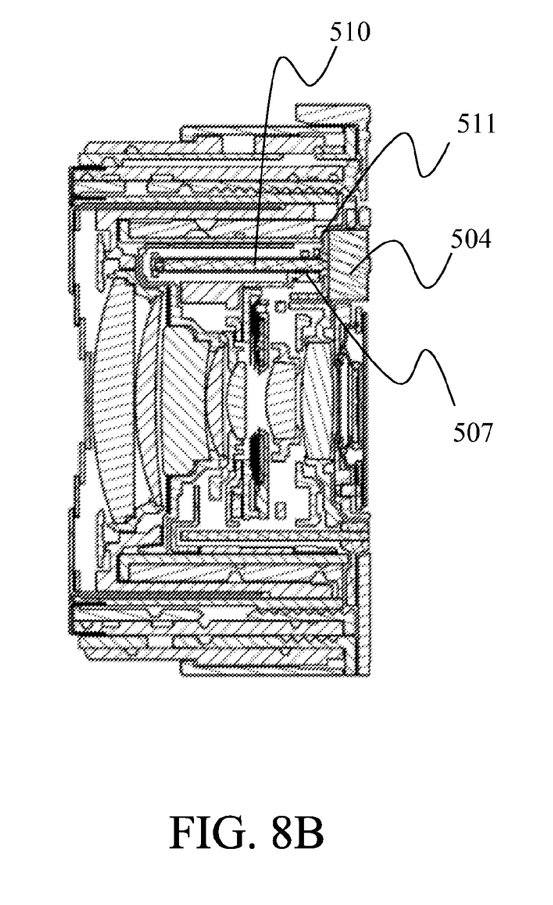

FIGS. 8A and 8B are sectional views of the lens barrel in the retracted state. FIG. 8A is a sectional view of the lens barrel in the retracted state passing centers of the optical axis and the fourth group lens 401. FIG. 8B is a sectional view of the lens barrel in the retracted state passing the optical axis and a center of the AF motor 504.

When the lens barrel is retracted state, the first to third, and fifth lens groups are arranged on the optical axis so as to narrow intervals between lens groups. The fourth lens group 400 evacuates from the optical axis and is adjacent to the third lens group 300.

When the camera is turned on, the lens barrel changes the shooting state by extending from the retracted state.

The zoom motor 902 is activated, and the drive ring 801 rotates through the gear train 901. Rotation of the drive ring 801 is transmitted to the outer cam ring 700 and the inner cam ring 600 through each rotation transmission key groove. The outer cam ring 700 moves in the optical axis direction according to a locus of the cam groove 800a of the fixing cylinder 800. The inner cam ring 600 moves in the optical axis direction relative to the outer straight cylinder 710 and the outer cam ring 700 according to a locus of the cam groove 710a of the outer straight cylinder 710. The first lens group 100 and the second lens group 200 move in the optical axis direction relative to the inner cam ring 600 according to loci of the first group cam groove 600a and the second group cam groove 600b, respectively. The third lens group 300 and the fourth lens group 400 move in the optical axis direction relative to the outer cam ring 700 according to loci of the third group cam groove 700a and the fourth group cam groove 700b, respectively. The fifth lens group 500 moves in the optical axis direction relative to the drive ring 801 according to a locus of the fifth group cam groove 801a.

When the lens barrel changes from the retracted state to the shooting state, a cam groove is formed so that the third lens group 300 extends in front of the fourth lens group 400.

First, a rearmost portion of the third lens holder 302 extends in front of a foremost portion of the fourth lens holder 402 so as to secure space for arranging the fourth lens 401 in the optical axis.

Next, the fourth lens group 400 gradually separates from the fifth lens base 503. According to the above operation, the protruding portion 503c of the fifth group base 503 gradually separates from the evacuating cam 402a of the fourth lens holder 402. The fourth lens holder 402 is rotatably urged in a direction where the fourth lens 401 is arranged on the image pickup optical axis by the torsion spring 404, and as a result, swings according the shape of the protruding portion 503c. When the engaging portion 402b of the fourth lens holder 402 abuts against the protruding portion 403c of the fourth group base 403, the fourth lens 401 is arranged on the image pickup optical axis and swing of the fourth lens holder 402 is restricted. Then, the fourth lens group 400 further separates from the fifth group base 503, and the protruding portion 503c totally separates from the evacuating cam 402a of the fourth lens holder 402. After the When the fourth lens 401 is arranged on the image pickup optical axis, the lens barrel becomes the wide state and the zoom motor 902 stops.

Figure 9:
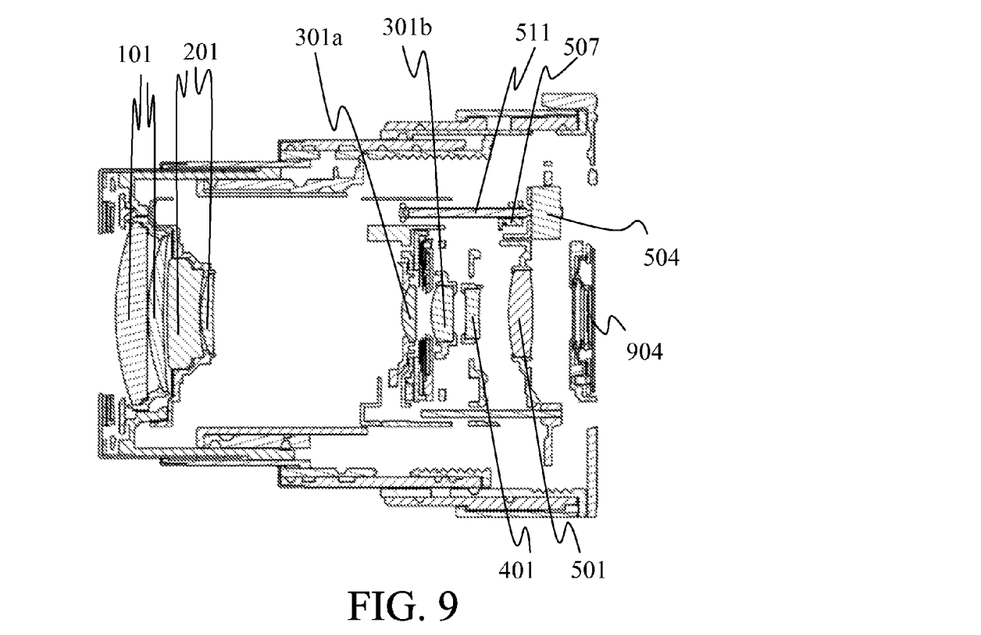
FIG. 9 is a sectional view of the lens barrel in a wide state.

FIG. 9 is a sectional view of the lens barrel in the wide state.

Around arrival of the zoom position to the wide end, the AF motor 504 drives so that the fifth lens holder 502 extends in the optical axis direction to a predetermined position relative to the fifth group base 503. Movement of the fifth lens holder 502 by the AF motor 504 and movement of the fifth group base 503 by the zoom motor 902 are separately performed.

When zooming from the wide end to the telescopic end, the zoom motor 902 further drives. The drive ring 801, the outer cam ring 700, and the inner cam ring 600 rotate, and the first to fifth lens groups move according to a locus of each cam groove. In the embodiment, each lens group moves along a locus illustrated in FIG. 11.

Figure 11:
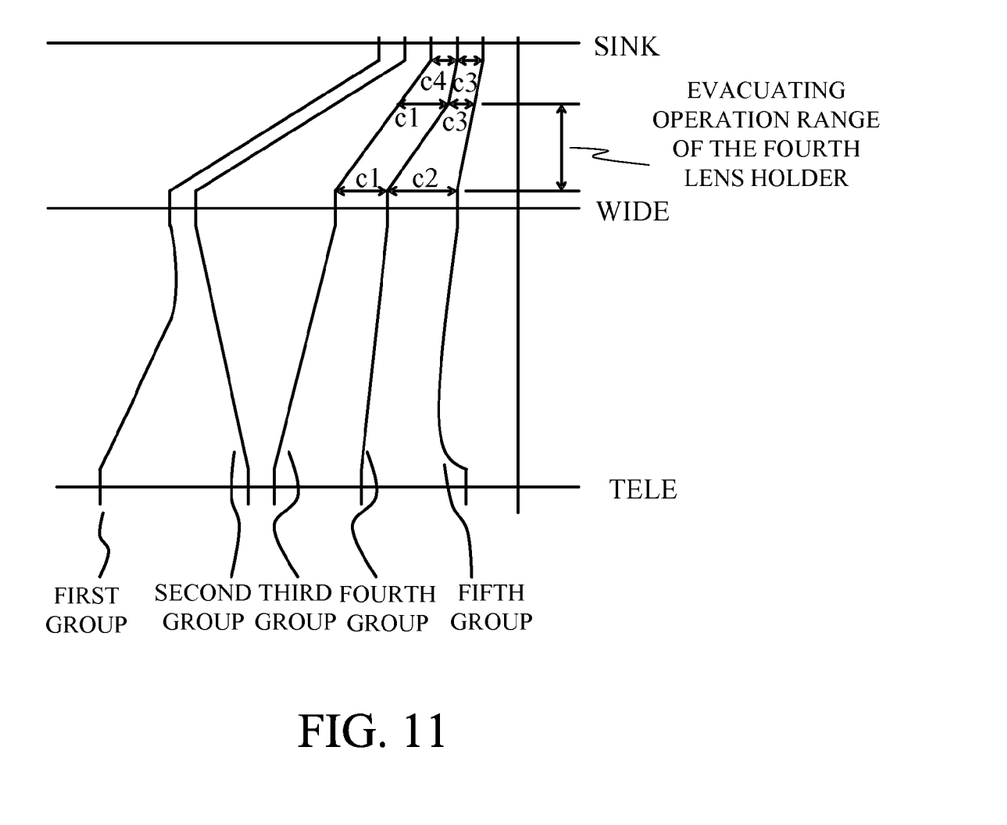
FIG. 11 is a schematic diagram illustrating a moving locus of each lens group.

The first lens group 100 once retracts, and moves in an extending direction. The second lens group 200 gradually retracts. The third lens group 300 and the fourth lens group 400 gradually retract. The fifth group base 503 once extends and moves in an extending direction. The fifth lens holder 502 is moved by the AF motor 504 independent of zooming.

Figure 10:
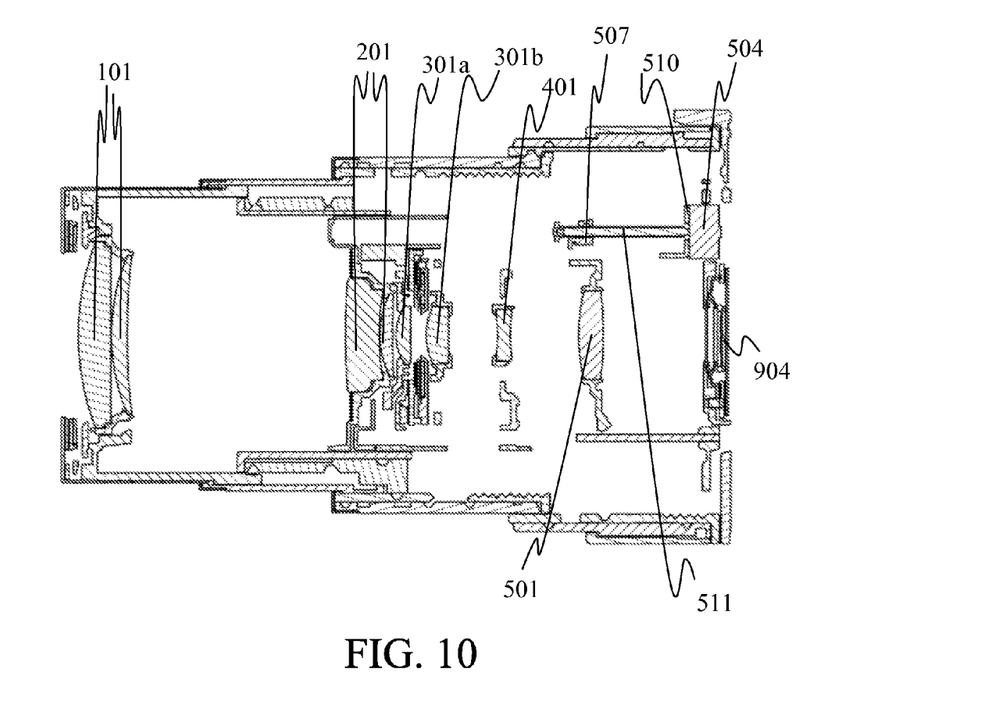
FIG. 10 is a sectional view of the lens barrel in a telescopic state.

FIG. 10 is a sectional view of the lens barrel in the telescopic state.

When zooming from the telescopic end to the wide end, the zoom motor 902 drives in an opposite direction. Then, each lens group moves in the optical axis direction according to a locus of each cam groove.

Next, change from the wide state to the retracted state is explained.

The fifth lens holder 502 is moved in a retracting direction relative to the fifth group base 503 by the AF motor 504. Around retraction of the fifth lens holder 502 retracts, the zoom motor 902 drives in the retracting direction. The first lens group 100 and the second lens group 200 move in the retracting direction according to each cam locus. The third lens group 300 and the fourth lens group 400 move in the retracting direction so as to keep lens interval. The fourth lens group 400 and the fifth group base 503 gradually approach each other. Since the fourth lens holder 402 moves in a direction parallel to the optical axis, the fourth lens holder 402 and the fifth group base 503 gradually approach each other.

FIGS. 12A to 12D are schematic diagrams illustrating change of the fourth lens holder 402 and the fifth group base 503 from the wide state to the retracted state.

The protruding portion 503c of the fifth group 503 includes an evacuating portion (evacuating cam portion) 503ca, which performs an evacuating operation of the fourth lens holder 402, and holding portion (evacuating holding portion) 503cb which holds the fourth lens holder 402 at the evacuating position. The holding portion 503cb is formed so as to be parallel to the optical axis.

Figure 12A:
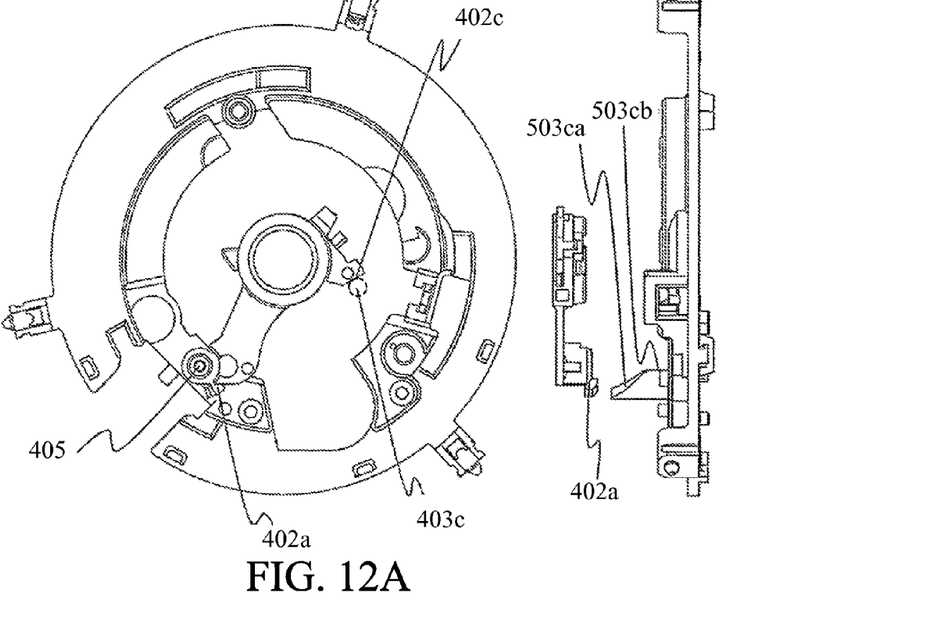
FIGS. 12A to 12D are schematic diagrams illustrating an evacuating operation of the fourth lens group.
Figure 12B:
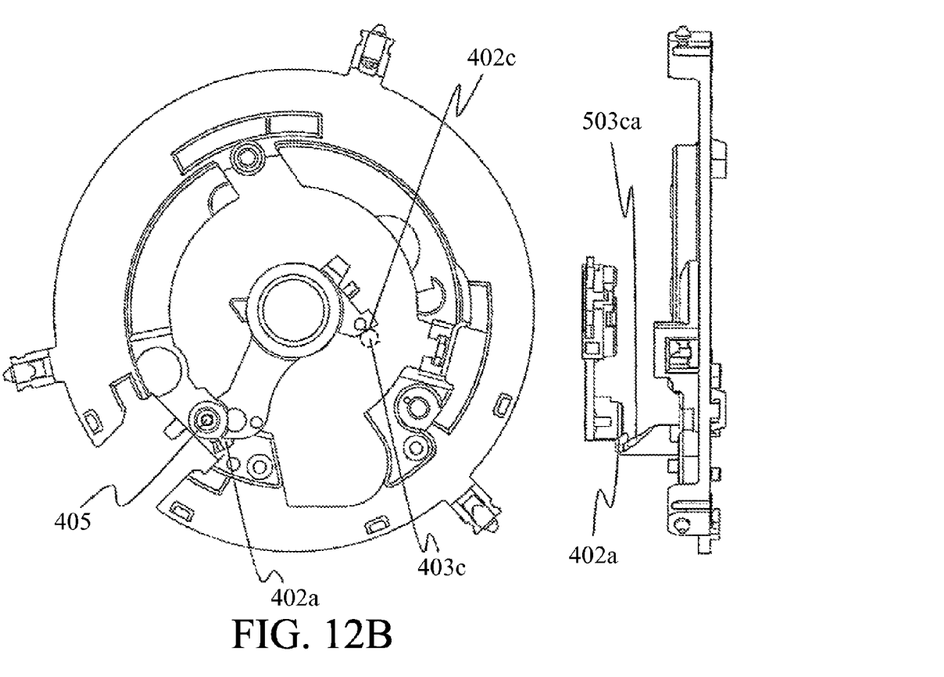
Figure 12C:
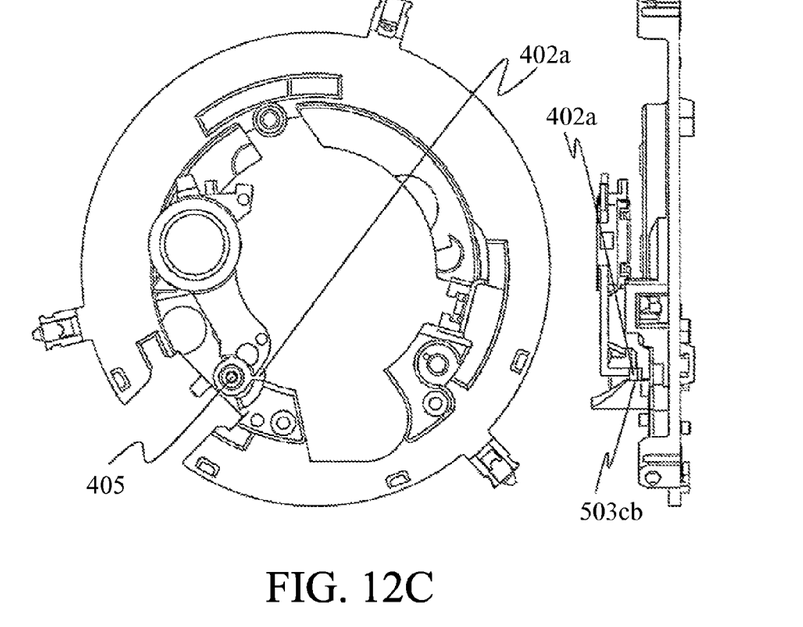
Figure 12D:
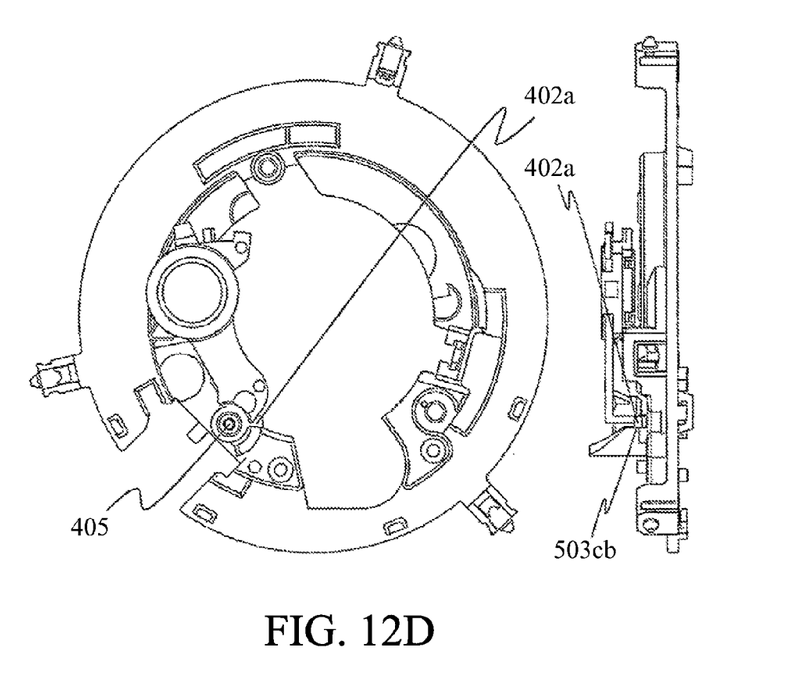

In the wide state, as illustrated in FIG. 12A, space between the evacuating cam 402a of the fourth lens holder 402 and the evacuating portion 503ca of the fifth group base 503 is formed. As illustrated in FIG. 12B, when the fourth lens holder 402 and the fifth group base 503 approach each other, the evacuating cam 402a abuts against the evacuating portion 503ca. When the fourth lens holder 402 and the fifth group base 503 further approach each other, the fourth lens holder 402 rotates around the swinging axis 405 against urging force of the torsion spring 404. As a result, as illustrated in FIG. 12C, the fourth lens 401 evacuates from the image pickup optical axis and the evacuating cam 402a abuts against the holding portion 503cb. The fourth lens holder 402 and the fifth group base 503 further approach each other so that the holding portion 503cb securely abuts against the evacuating portion 402a, and the fourth lens group 400 becomes the state illustrated in FIG. 12D.

After the fourth lens 401 evacuates from the image pickup optical axis, the third lens group 300 and the fourth lens group 400 approach each other in the optical axis direction, and the third lens holder 302 begins to overlap the fourth lens holder 402 in the optical axis direction. When the lens barrel becomes the retracted state, the third lens holder 302 is adjacent to the fourth lens holder 402, and each lens group becomes positional relationship illustrated in FIG. 8B.

Action of force relative to the fifth group base 503 and the fourth group base 403 in the evacuating operation of the fourth lens holder 402 according to the embodiment is explained in detail.

Figure 13:
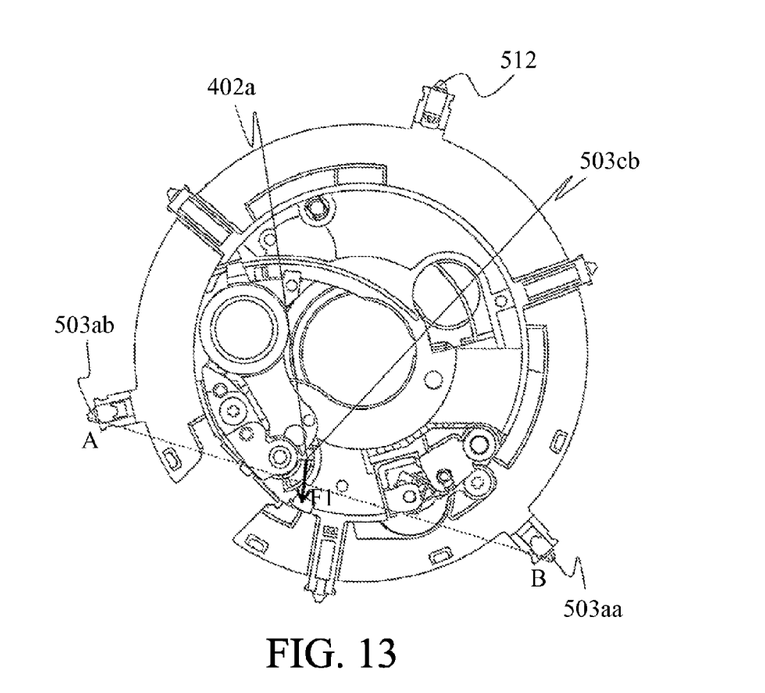
FIG. 13 is a schematic diagram illustrating force applied to the fifth lens group.
Figure 14:
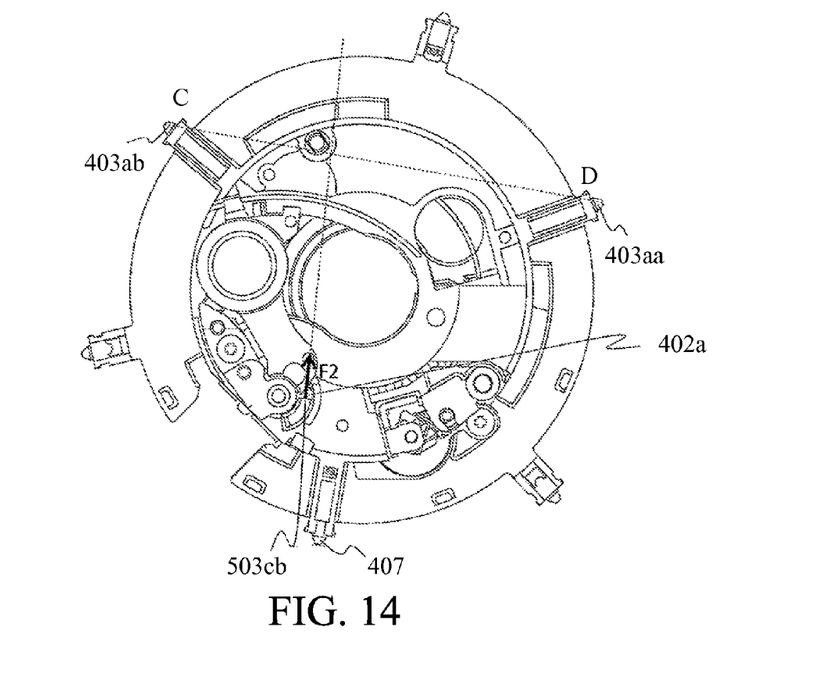
FIG. 14 is a schematic diagram illustrating force applied to the fourth lens group.

FIG. 13 is a schematic diagram illustrating force applied to the fifth lens group 500. FIG. 14 is a schematic diagram illustrating force applied to the fourth lens group 400.

Force applied to the fifth lens group 500 by the evacuating operation of the fourth lens holder 402 is explained with reference to FIGS. 7 and 13.

When the lens barrel changes the retracted state, the fourth lens holder 402 rotates around the swinging axis 405 against the urging force of the torsion spring 404, and is held so that the evacuating cam 402a abuts against the holding portion 503cb. However, force F1 (see FIG. 13), which is directed in a normal direction relative to an abutting surface between the evacuating cam 402a and the holding portion 503cb is applied to the holding portion 503cb by the urging force of the torsion spring. The fifth group base 503 may be then move in a "F1" direction. As a result, since the fifth group base 503 is held at a position moved in the "F1" direction from the predetermined position, the fifth group base 503 may interfere with other components in the retracted state of the lens barrel.

In the embodiment, a straight line extended in a direction, where the force F1 is applied to the holding portion 503cb from the abutting surface between the evacuating cam 402a and the holding portion 503cb intersects with a line segment AB between the fixing pins 503aa, 503ab. Even if the urging force of the torsion spring 404 is applied, the fifth group base 503 and the drive ring 801 can be thus stretched by the foxing pins 503aa, 503ab. As a result, movement of the holding portion 503cb i.e. movement of the fifth group base 503 in a surface perpendicular to the optical axis is prevented, and high accurate evacuating lens mechanism is performable.

Force applied to the fourth lens group 400 by the evacuating operation of the fourth lens holder 402 is explained with reference to FIGS. 4 and 14. As a reaction of the force F1 applied to the holding portion 503cb by the urging force of the torsion spring 404, force F2 (see FIG. 14), which is directed in a normal direction relative to the abutting surface between the evacuating cam 402a and the holding portion 503cb is applied to the evacuating cam 402a. The fourth group base 403 holding the fourth lens holder 402 may be then move in a "F2" direction. As a result, since the fourth lens holder 402 and the fourth group base 403 are held at a position moved in the "F2" direction from the predetermined position, the fourth lens holder 402 and the fourth group base 403 may interfere with other components in the retracted state of the lens barrel.

In the embodiment, a straight line extended in a direction, where the force F2 is applied to the evacuating cam 402a, from the abutting surface between the evacuating cam 402a and the holding portion 503cb intersects with a line segment CD between the fixing pins 403aa, 403ab. Even if the reaction force is applied, the fourth group base 403 and the outer cam ring 700 can be thus stretched by the foxing pins 403aa, 403ab. As a result, movement of the evacuating portion 402a i.e. movement of the fourth lens holder 402 and the fourth group base 403 in a surface perpendicular to the optical axis is prevented, and high accurate evacuating lens mechanism is performable.

In the embodiment, the evacuating mechanism of the fourth lens group 400 by the protruding portion 503c formed on the fifth lens group 500, which is a focus lens group, is explained, but it is performable by an arbitrary combination in combinations of movable groups.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-010188, filed on Jan. 23, 2014, which is hereby incorporated by reference herein in its entirety.

What is claimed is:

1. An optical apparatus comprising:
   an image pickup optical system;
   an evacuating optical system movable between a shooting state where an optical element is positioned on an optical axis of the image pickup optical system and an evacuating state where the optical element evacuates from the optical axis;
   a first urging member urging the evacuating optical system so that the evacuating optical system becomes the shooting state;
   a first moving member including the evacuating optical system and the first urging member, and configured to move in an optical axis direction;
   a second moving member including a sliding portion which the evacuating optical system slides on when moving, and configured to move in the optical axis direction; and
   a first cam cylinder member including a plurality of first cam portions,
   wherein the second moving member includes a first cam follower portion, a second cam follower portion, and a third cam follower portion at positions approximately equally divided the second moving member into three in a circumference direction,
   wherein the first, second, and third cam follower portions follows the plurality of first cam portions formed on the first cam cylinder member so that the second moving member moves in the optical axis direction,
   wherein a second urging member urging in a radial direction of the second moving member as viewed from the optical axis direction is attached to the first cam follower portion,
   wherein in a case where the evacuating optical system is the evacuating state, a straight line extended in a direction, where the evacuating optical system works on the sliding portion by the first urging member, intersects with a line segment between the second and third cam follower portions.

2. The optical apparatus according to claim 1, wherein the sliding portion includes an evacuating cam portion which moves the evacuating optical system so that the evacuating optical system becomes the evacuating state and an evacuating cam portion which holds the evacuating optical system in the evacuating state.

3. The optical apparatus according to claim 1 further comprising a second cam cylinder member which includes a plurality of second cam portions,
   wherein the first moving member includes a fourth cam follower portion, a fifth cam follower portion, and a sixth cam follower portion at positions approximately equally divided the first moving member into three as viewed from the optical axis direction,
   wherein the fourth, fifth, and sixth cam follower portions follows the plurality of first cam portions formed on the second cam cylinder member so that the first moving member moves in the optical axis direction,
   wherein a third urging member urging in a radial direction of the first moving member as viewed from the optical axis direction is attached to the fourth cam follower portion,
   wherein in a case where the evacuating optical system is the evacuating state, a straight line extended in a direction, where the sliding portion works on the evacuating optical system by the first urging member, intersects with a line segment between the fifth and sixth cam follower portions.

* * * * *